(12) United States Patent
Ishimoto

(10) Patent No.: US 7,406,016 B2
(45) Date of Patent: Jul. 29, 2008

(54) OPTICAL DISK APPARATUS AND CONTROL METHOD FOR CONTROLLING DISTANCE BETWEEN A HEAD AND A DISK

(75) Inventor: Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 11/030,972

(22) Filed: Jan. 10, 2005

(65) Prior Publication Data
US 2005/0190666 A1 Sep. 1, 2005

(30) Foreign Application Priority Data
Jan. 20, 2004 (JP) ............... 2004-012073

(51) Int. Cl.
*G11B 11/03* (2006.01)
(52) U.S. Cl. ............... 369/53.28; 369/44.35
(58) Field of Classification Search .......... None
See application file for complete search history.

(56) References Cited
U.S. PATENT DOCUMENTS

| 6,717,896 B1 * | 4/2004 | Imanishi | 369/53.27 |
| 7,099,259 B2 * | 8/2006 | Imanishi | 369/112.24 |
| 2001/0021145 A1 * | 9/2001 | Ichimura et al. | 369/43 |
| 2002/0163869 A1 * | 11/2002 | Ishimoto | 369/53.37 |
| 2004/0100878 A1 * | 5/2004 | Chu et al. | 369/44.23 |
| 2006/0274610 A1 * | 12/2006 | Saito et al. | 369/13.33 |
| 2007/0183298 A1 * | 8/2007 | Saito et al. | 369/112.16 |

FOREIGN PATENT DOCUMENTS

| JP | 2000-200434 | * | 7/2000 |
| JP | 2001-023182 | * | 1/2001 |
| JP | 2001-076358 | * | 3/2001 |
| JP | 2002-319157 | * | 10/2002 |

* cited by examiner

*Primary Examiner*—Paul Huber
(74) *Attorney, Agent, or Firm*—Oblon, Spivak, McClelland, Maier & Neustadt, P.C.

(57) ABSTRACT

An optical apparatus includes: a light source outputting light; a head disposed so as to face a disk on which a signal is recordable, the head being capable of condensing a light from the light source onto the disk as near-field light; an distance adjusting mechanism adjusting a distance between the head and the disk; first control means for causing the head to approach the disk and controlling the head to nearly stop at a position where a distance from the disk is a first distance at which the light is condensed on the disk by the head as the near-field light; detection means for detecting if the distance is the first distance; and second control means for controlling the distance adjusting mechanism based on the detected signal so as that the distance is a second distance under near-field light condition.

7 Claims, 7 Drawing Sheets

OPTICAL DISK APPARATUS AND CONTROL METHOD FOR CONTROLLING DISTANCE BETWEEN A HEAD AND A DISK

CROSS REFERENCES TO RELATED APPLICATIONS

The present invention contains subject matter related to Japanese Patent Application JP 2004-012073 filed in the Japanese Patent Office on Jan. 20, 2004, the entire contents of which being incorporated herein by reference.

BACKGROUND OF THE INVENTION

1. Field of the Invention

The present invention relates to an optical disk apparatus for performing at least one of recording and reproducing of signals by using near-field light, and to a control method therefor.

2. Description of the Related Art

In recent years, to enhance a recording density at which signals are recorded on an optical disk by using laser light, there has been proposed an optical disk apparatus that records or reproduces signals by using near-field light. In the optical disk on which signals are recorded by using near-field light, it is necessary to control the length of the gap between an optical disk and an end surface of an SIL (Solid Immersion Lens) installed in a head including an objective lens section in such a way as to be reduced to a distance at which the generation of near-filed light is enabled. Generally, this distance is half the wavelength of input laser light. For example, in the case of using 400 nm wavelength blue-violet laser beams, this distance is about 200 nm.

Thus, an overshoot, which is not problematical for far-field optical systems, such as a DVD (Digital Versatile Disk), and which is caused if the length of the gap is equal to or less than 1 μm at the starting of the control of the gap, is problematical for optical recording/reproducing apparatuses using near-field light. In other words, even if an overshoot occurs if the gap is equal to or less than 1 μm at the starting of control of the gap, the SIL collides with the disk. This causes damage to both the SIL and the disk.

To solve this problem, a method of controlling the gap based on a quantity of return laser light, which is reflected by the disk, is used. For instance, in a case where 400 nm wavelength laser light is used, generally, the length of the gap, at which a near-field condition occurs, is equal to or less than half the wavelength thereof. Therefore, if the length of the gap is more than 200 nm, that is, in a far-field condition, all light from a laser light source, which is incident upon the end surface of the SIL at an angle at which total reflection thereof occurs, is reflected on the end surface of the SIL so that a quantity of return light is constant. However, if the length of the gap is equal or less than 200 nm, that is, in the near-field condition, a part of light being incident upon the end surface of the SIL at the angle, at which total reflection occurs, penetrates through the end surface of the SIL. Thus, a total-reflection return-light quantity decreases. Further, if the length of the gap between the SIL and the disk is zero, that is, when the SIL touches the disk, all the light being incident upon the end surface of the SIL at the angle, at which total reflection occurs, penetrates through the end surface of the SIL, so that the total-reflection return-light quantity is zero. According to this technique, this total-reflection return-light quantity is detected by a photodetector. Then, a gap servo operation is performed on the SIL by feeding back the detected total-reflection return-light quantity to an actuator (for example, a 2-axis device for performing a focusing servo operation and a tracking servo operation) for the SIL (see, for instance, Japanese Patent Application Publication 2002-76358, Paragraph 0026 and FIG. 3).

Furthermore, there is another method used. According to this method, a threshold (a gap servo starting threshold value) for identifying a near-field condition is set. Then, the SIL is made to slowly approach the disk. A gap servo operation would not start until the total-reflection return-light quantity becomes smaller than a gap servo starting threshold value. In other words, the gap servo operation would not start until the distance therebetween becomes equal to a near-field distance.

SUMMARY OF THE INVENTION

However, the method described above may be impractical, because time taken to realize a target gap is long unless the initial position of the SIL is set to be close to the disk. For example, in a case where the 2-axis device is used as a lens drive device, similarly to the case of using a DVD or the like, and where the SIL is made to approach the disk at an extremely slow speed of several μm/sec from a position located at a distance of hundreds μm from the disk, similarly thereto, it takes hundreds seconds to cause a near-field condition.

Further, although occurrence of this problem can be avoided by setting the initial position of the SIL within a near-field region, the SIL may collide with the disk due to disturbance, such as vibrations. Thus, it is difficult and impractical to set the SIL at a position located at a distance, which is equal to or less than 200 nm, without gap control.

Accordingly, it is desirable to provide an optical disk apparatus capable of controlling a head in such a way that the head can reach a target position in a near-field region within a shorter period of time as possible while making sure to prevent the head from colliding with the disk, and to provide a control method therefor. The present invention is conceived in view of the foregoing circumstances.

According to an embodiment of the present invention, there is provided an optical disk apparatus including: a light source outputting light; a head disposed so as to face a disk, on which a signal is recordable, and capable of condensing the light outputted from the light source onto the disk as near-field light; an distance adjusting mechanism adjusting a distance between the head and the disk; first control means for causing the head to approach the disk and for controlling the head in such a way as to nearly stop at a position where a distance from the disk is a first distance at which the light is condensed on the disk by the head as the near-field light; detection means for detecting if the distance between the head and the disk is the first distance; and second control means for controlling the distance adjusting mechanism based on a detection signal outputted by the detection means so as that the distance between the head and the disk is constant (a second distance) under a condition in which the light is condensed on the disk as the near-field light.

According to the present embodiment, the head is caused by the first control means to approach a position at the first distance from the disk, at which the light outputted from the head is condensed on the disk as the near-field light. Furthermore, at that position, the head is nearly stopped, and then, the second control means controls the head such that the distance between the head and the disk is constant. Consequently, in the condition in which the head is positioned at the first distance from the disk, that is, positioned in the near-field, the initial speed of the head can be set nearly at zero. Thus, disturbance due to the initial speed can be prevented. Accordingly, it is possible to control the head movement such that the head can reach the target position in the near-field region within a shorter period of time as possible while making sure to prevent the head from colliding with the disk According to the present embodiment, the first distance is not limited to a specific value, and an arbitrary value may be selected as long as the light outputted from the head is condensed on the disk as the near-field light. The first distance may be set as, for instance, a gap servo initial threshold value at the start of a gap servo operation.

According to another embodiment of the present invention, the second control means may control the distance adjusting mechanism in such a way that the second distance is less than the first distance. According to the present embodiment, the second control means controls the head such that the head is caused to approach a position at the first distance from the disk, which is larger than the second distance therefrom, and that the head is further caused to approach a position at the second distance therefrom. Consequently, as compared with a case where the head is controlled such that the second distance is larger than the first distance, the collision of the head with the disk may be prevented more completely. Furthermore, the gap may be efficiently controlled by reducing the control time. The second distance is a target value of a gap servo control operation.

According to another embodiment, the optical disk apparatus according to the embodiment described above may further include measuring means for measuring a quantity of return light from the disk, which corresponds to the light outputted from the light source. Moreover, the second control means may control the distance adjusting mechanism based on the quantity of the return light, which is measured by the measuring means. When the head is positioned in the near-field region, the quantity of the return light and the length of the gap have a linear relation with each other. Thus, the controlling of the head can easily be achieved.

According to an embodiment of the present invention, before the head is controlled by the first control means, a third distance between the head and the disk is set in such a way that the head is nearly stopped at the position at the first distance. Accordingly, the first control means and the second control means can control the distance adjusting mechanism independent of each other simply by preliminarily setting an initial position of the head from the disk as the third distance, thereby making it possible to control the gap by a system of a relatively simple configuration.

According to an embodiment of the present invention, there is provided the optical disk apparatus according to the embodiment described above, which may further include means for setting the second distance by making the second distance to vary with time. Consequently, a pull-in response to the position at the second distance can be improved.

According to an embodiment of the present invention, there is provided a method for controlling an optical disk apparatus. The method includes: (a) a step of causing a head to approach a disk, the head being disposed in such a way as to face the disk on which a signal is recordable and capable of condensing light outputted from a light source onto the disk as near-field light; (b) a step of nearly stopping the approaching head at a position at which a distance from the disk is a first distance where the light is condensed on the disk by the head as the near-field light; (c) a step of detecting if the distance between the head and the disk is the first distance; and (d) a step of controlling the distance between the head and the disk based on a detection signal detected at the step (c) such that the distance therebetween is constant in a condition in which the light is condensed on the disk as the near-field light.

According to the embodiment of the present invention, the initial speed of the head can be set at nearly zero in the condition in which the head is positioned at the first distance from the disk, that is, in the near-field. Thus, disturbance due to the initial speed can be prevented. Consequently, the collision of the optical head with the optical disk can be surely prevented while reducing time, which is taken to cause the head to move to a target position in a near-field region, as much as possible.

As above-mentioned, according to the embodiments of the present invention, the collision of the head with the disk can be surely prevented while reducing time, which is taken to cause the head to move to a target position in the near-field region, as much as possible.

BRIEF DESCRIPTION OF THE DRAWINGS

The above and other objects, features and advantages of the present invention will become more apparent from the following description of the presently exemplary embodiment of the present invention taken in conjunction with the accompanying drawings, in which.

DETAILED DESCRIPTION OF THE EMBODIMENTS

Hereinafter, an embodiment of the present invention is described with reference to the accompanying drawings.

Figure 1:
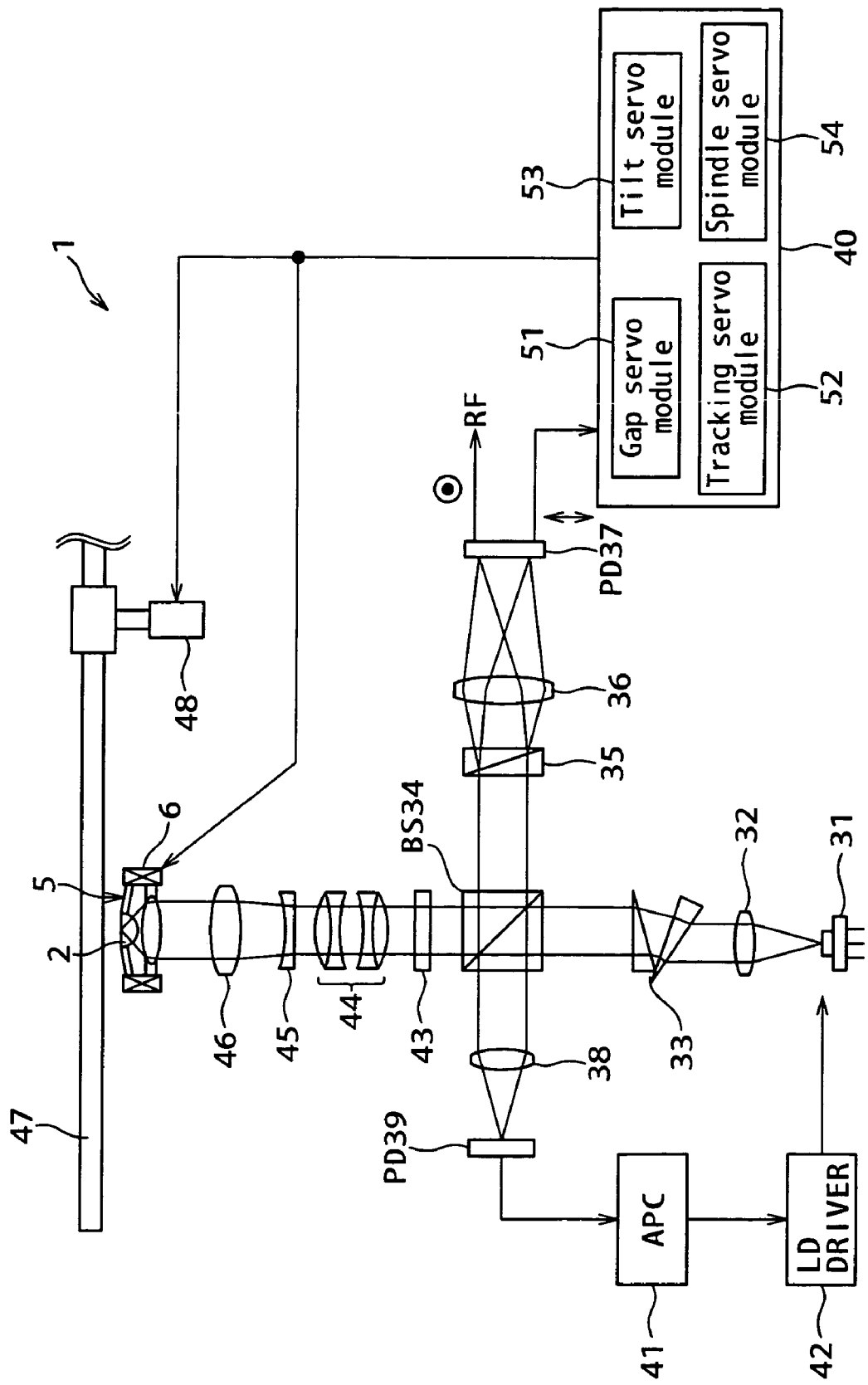
FIG. 1 is a diagram illustrating a configuration of an optical disk apparatus according to an embodiment of the present invention.

FIG. 1 is a diagram illustrating the configuration of an optical disk apparatus according to an embodiment of the present invention. The optical disk apparatus 1 has a laser diode (LD) 31 serving as a light source. The optical disk apparatus 1 further has collimator lenses 32 and 45, an anamorphic prism 33 for shaping laser light, a beam splitter (BS) 34, a quarter-wave plate (QWP) 43, a chromatic aberration correction lens 44, a laser-beam expanding lens 45, a Wollaston prism 35, condensing lenses 36 and 38, and an optical head 5. Furthermore, the optical disk apparatus 1 has photodetectors (PDs) 37 and 39, an automatic power controller 41, an LD driver 42, a servo control system 40, and a spindle motor 48.

The Wollaston prism 35 includes two subprisms. Light having been incident upon this Wollaston prism 35 is polarized and split into output light beams that are polarized perpendicular to each other and have substantially equal intensity components in opposite directions. The PD 37 outputs an RF reproducing signal, which is used for reproducing a signal recorded on the optical disk, and further outputs a tracking error signal and a gap error signal, which are needed for a servo control operation, to the servo control system 40.

The servo control system 40 has a gap servo module 51 (to be described later) and further has a tracking servo module 52, a tilt servo module 53, and a spindle servo module 54. The tracking servo module 52 tracking-controls the optical head based on the tracking error signal. The tilt servo module 53 controls a tilt angle of the optical head 5. The spindle servo module 54 controls the rotation of the spindle motor 48.

The automatic power controller 41 outputs a predetermined signal based on an output signal of the PD 39 to the LD driver 42 so as that output laser power of the LD 31 is kept constant.

Next, a general operation of this optical disk apparatus 1 is described hereinbelow. For example, an optical disk 47 serving as a recording medium is set in the optical disk apparatus 1. Then, the servo control system 40 performs servo control operations. On the other hand, laser light outputted from the LD 31 is transformed by the collimator lens 32 into parallel light. The parallel light is shaped by the anamorphic prism 33. Subsequently, the laser light is incident on the BS 34 and then split into laser light, which is incident on the QWP 43 without changing a traveling direction thereof, and laser light that is incident on the condensing lens 38. The laser light having been incident on the condensing lens 38 is controlled by the automatic power controller 41, as above-mentioned, so that the power of laser light is constant. The light having been incident on the QWP 43, which is linearly polarized light, is converted by the QWP 43 into circularly polarized light. Then, the chromatic aberration of the circularly polarized light is corrected by the chromatic aberration correction lens 44. The aberration-corrected light is incident on the optical head 5 through the expanding lens 45 and the collimator lens 46.

The laser light having been incident upon the optical head 5 is condensed on the optical disk 47 as near-field light, so that a signal is recorded on the optical disk 47. To read the signal recorded on the optical disk 47 on which the laser light is condensed as the near-field light, the apparatus receives reflection light or diffraction light from the optical disk 47. The reflection light or the diffraction light coming form the optical disk 47 is incident on the BS 34 through the optical head 5, the collimator lens 46, the expanding lens 45, the chromatic aberration correction lens 44, and the QWP 43 as return light. Then, an RF reproducing signal and a servo control signal are obtained by the PD 37. The servo control signal is inputted to the servo control system 40, so as that servo control operations are performed.

Figure 2:
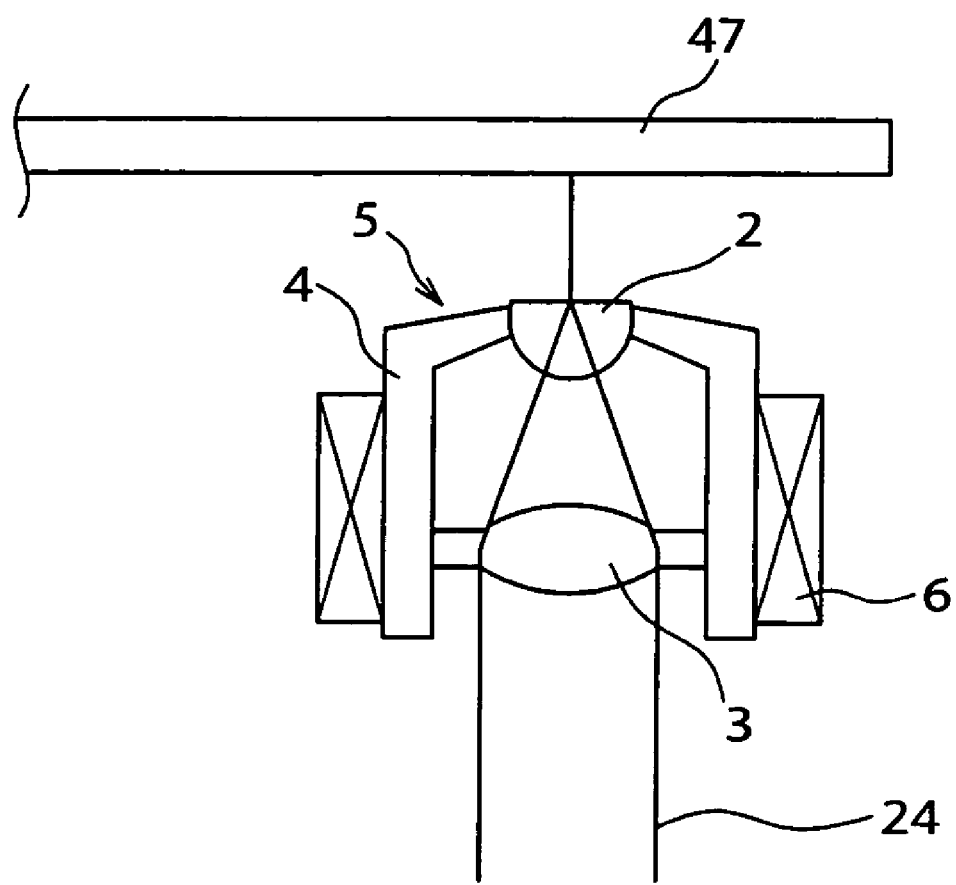
FIG. 2 is a side view illustrating an optical head and an optical disk.

FIG. 2 is a side view illustrating the optical head 5 and the optical disk 47. The optical head 5 is disposed in such a way as to face the optical disk 47. The optical head 5 is constructed by accommodating the SIL 2 and an aspherical lens 3 in a lens holder 4 and by placing the lens holder 4 in a 3-axis device 6 serving as a distance adjusting mechanism. The 3-axis device is illustrated in the figure by being simplified. However, the 3-axis device may include coils and yokes respectively associated with 3 axial directions. Focusing servo control operations, which include a tracking servo control operation and a gap servo control operation, and a tilt servo control operation are performed by feeding electric currents, which correspond to predetermined servo voltages, to the coils. In some of cases where embodiments of the present invention are applied to, the optical disk apparatus 1, the tracking servo module 52 and the tilt servo module 53 may not be included.

Figure 3:
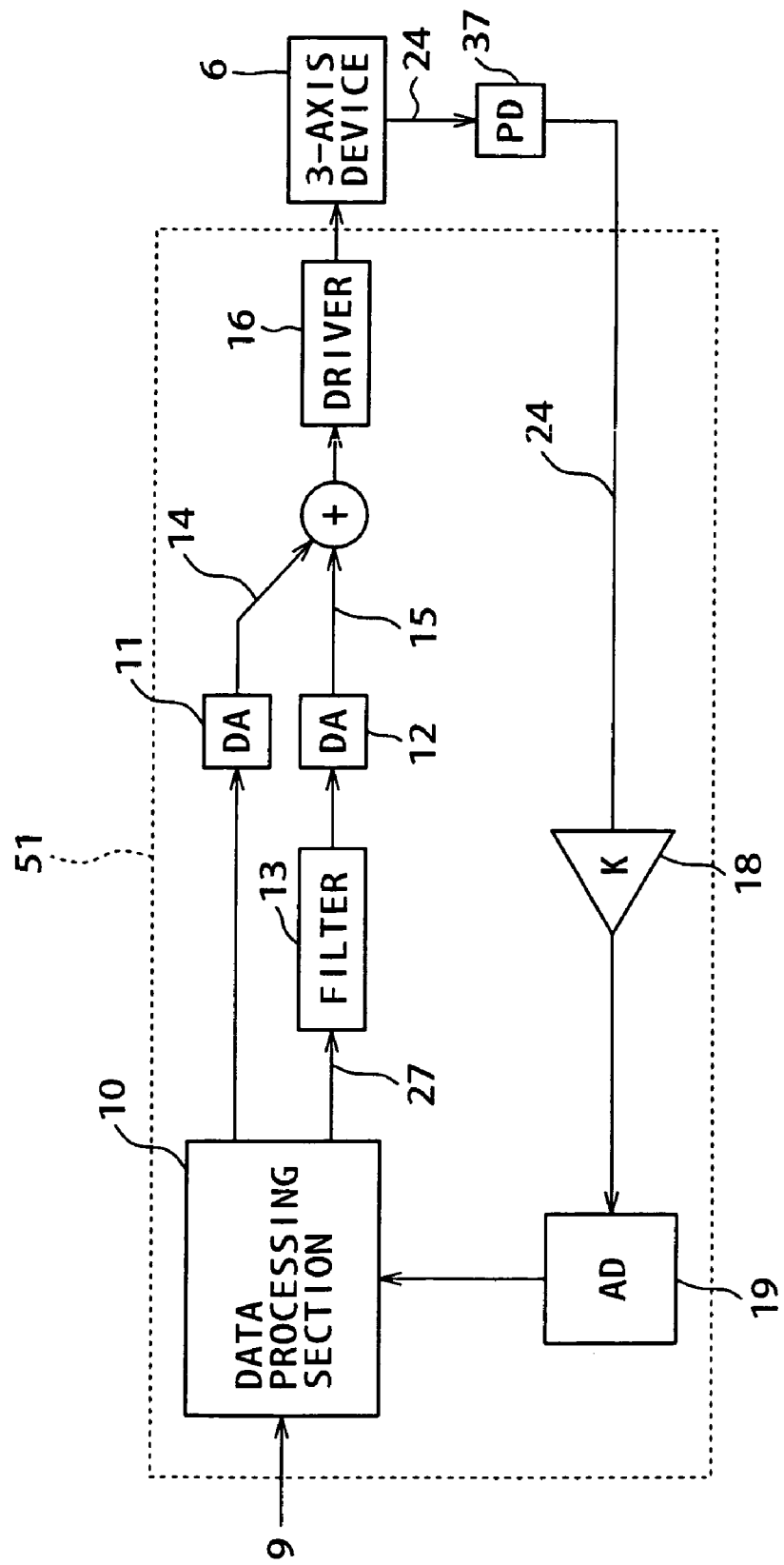
FIG. 3 is a block diagram illustrating a configuration of a gap servo module.

FIG. 3 is a block diagram illustrating an outline of the gap servo module 51. An object to be controlled is the 3-axis device 6. Further, a detection quantity (or a controlled quantity) is a total-reflection return-light quantity 24, which is detected by the PD 37, as above-mentioned. The detected total-reflection return-light quantity 24 is normalized by a normalization gain element 18 to, for example, 1 V. The normalized signal is digitalized at an AD (Analog to Digital) converter 19. The digitalized total-reflection return-light quantity is inputted to the data processing section 10. Then, this data processing section 10 outputs a signal representing a voltage for causing the SIL 2 to approach the optical disk 47. This voltage signal is converted by a DA (Digital to Analog) converter 11 into an analog signal that is outputted therefrom as a signal representing an approach voltage. Further, a gap error signal is inputted to a filter 13, whose output is then converted by a DA converter 12 into an analog signal that is outputted as a signal representing a servo voltage 15. The approach voltage 14 and the servo voltage 15 are added. A result of the addition is inputted to a driver 16, which then drives the 3-axis device 6 so as that a gap error becomes zero.

Figure 4:
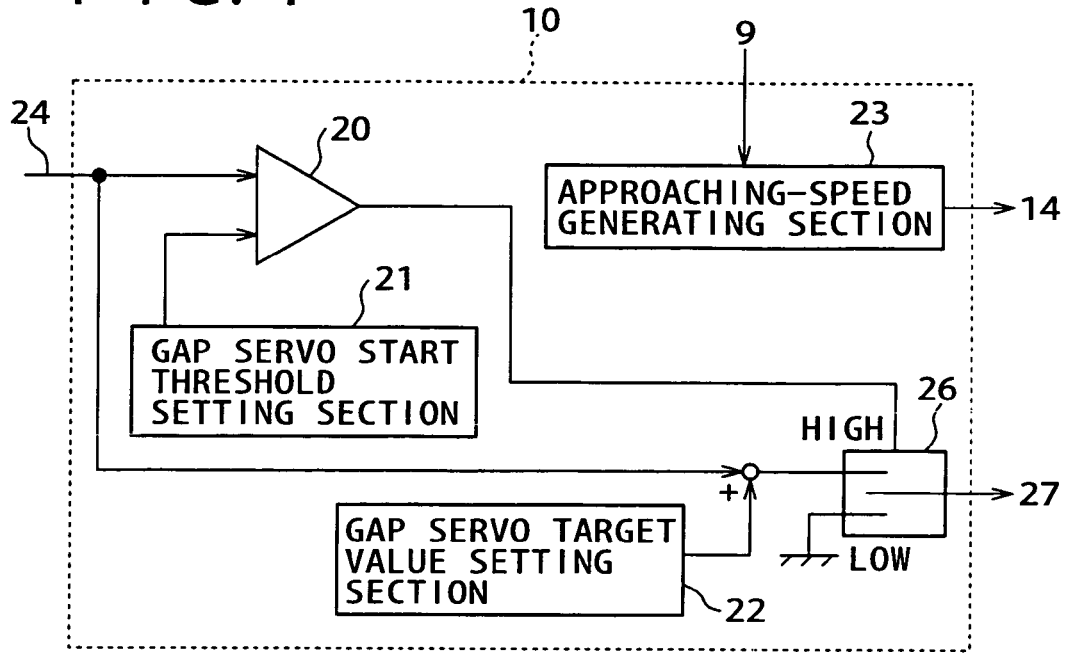
FIG. 4 is a block diagram illustrating details of a data processing section.

FIG. 4 is a block diagram illustrating the details of the data processing section 10.

A signal representing the total-reflection return-light quantity 24 and a gap servo switching signal 9 are inputted to the data processing section 10. The gap servo switching signal 9 may be, for example, a signal which is inputted to the data processing section 10 if the optical disk is mounted in the optical disk apparatus 1. However, the timing, with which the gap servo switching signal 9 is inputted, is not limited only to this example. The total-reflection return-light quantity 24 is compared by a comparator 20 with a gap servo initial threshold value 8 set at the gap servo initial threshold value setting section 21.

Figure 5:
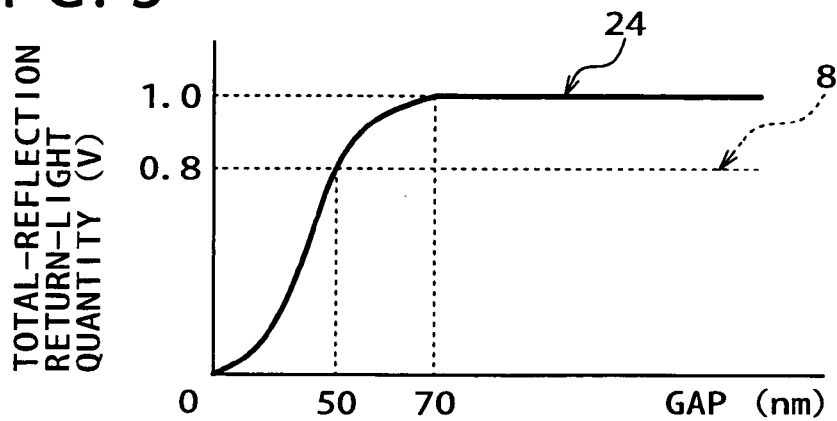
FIG. 5 is a graph illustrating an example of setting of a gap servo initial threshold value.

Furthermore, this gap servo initial threshold value 8 is set, for instance, as illustrated in FIG. 5. In other words, this gap servo initial threshold value 8 is set in the near-field region in such a way as to be larger than a gap servo target value. For example, as illustrated in FIG. 5, if the value of the total-reflection return-light quantity 24 in the far-field region is normalized to 1 (V), the gap servo initial threshold value 8 may be set at 0.8 (V). The gap servo target value is set at a gap servo target value setting section 22.

According to a result of the comparison by the comparator 20, for instance, if the total-reflection return-light quantity 24 is larger than the gap servo initial threshold value 8, that is, when the SIL is positioned at a far-filed distance, an output of the comparator 20 is Low. Conversely, if the value of the total-reflection return-light quantity 24 is smaller than the gap servo initial threshold value 8, that is, when the SIL is positioned at a near-filed distance, the output of the comparator 20 is High. If the output of the comparator becomes High, a switch 26 is turned on. A gap servo operation is not started until that time. The gap servo target value set at the gap servo target value setting section 22 is added to the approach voltage at the start of the gap servo operation (or the voltage corresponding to the total-reflection return-light quantity at the start of the gap servo operation). Accordingly, a servo voltage 27 is outputted so as that the length of the gap becomes equal to the target value.

Figure 6:
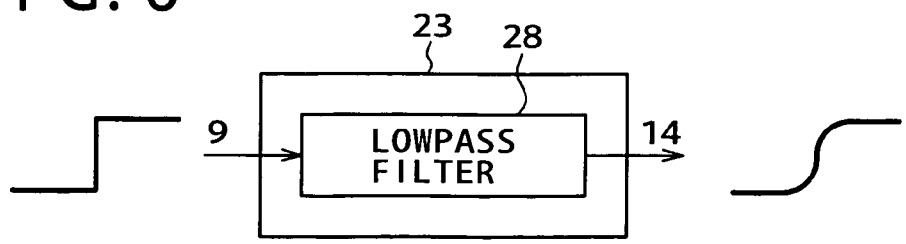
FIG. 6 is a diagram illustrating an example of a configuration of an approaching-speed generating section.

FIG. 6 is a diagram illustrating an example of the configuration of an approaching-speed generating section 23. An input signal to the approaching-speed generating section 23 is the gap servo switching signal 9, while an output signal therefrom is a signal representing the approach voltage 14. The approaching-speed generating section 23 includes, for example, a lowpass filter. In this case, the input signal, which is the gap servo switching signal 9, is a step-like signal as shown in this figure. Thus, the output of the approaching-speed generating section 23 is obtained as a signal illustrated in this figure, by lowpass-filtering the step-like signal. Thus, the optical head 5 smoothly approaches the disk 47 based on the lowpass-filtered signal. The gap servo operation is then started if the value of the approach voltage becomes equal to a final voltage value.

Figure 7:
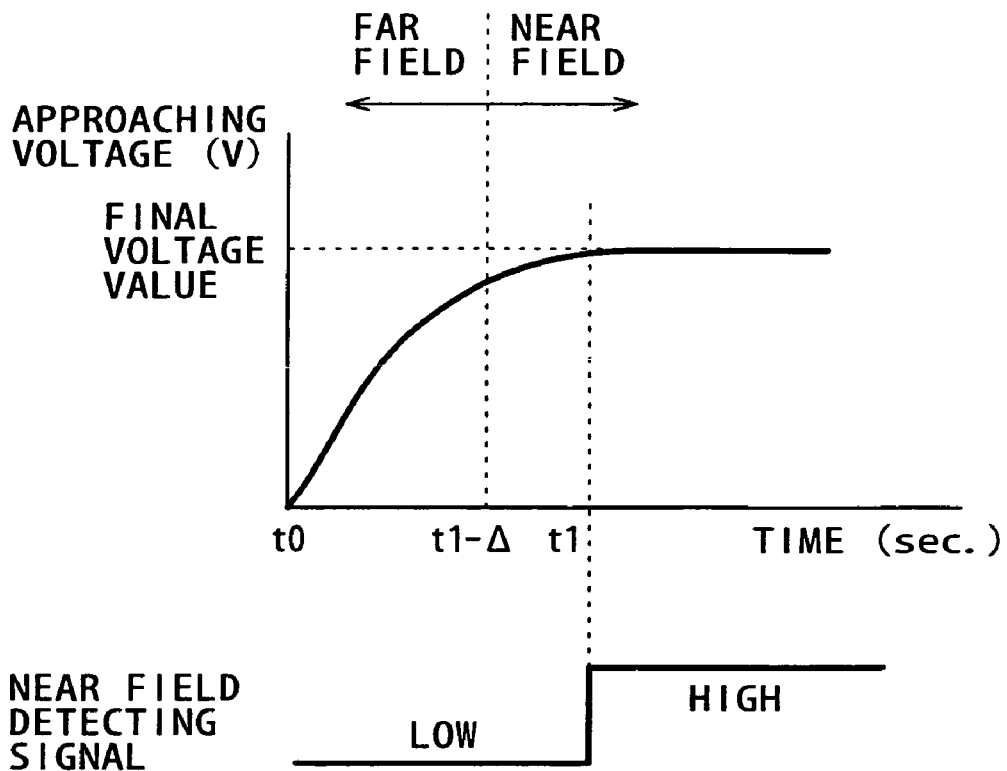
FIG. 7 is a graph illustrating change with respect to time in an approach voltage outputted from an approaching-speed generating section.

This process is illustrated in FIG. 7. As illustrated in FIG. 7, at moment t1, the output of the comparator 20 changes from Low to High, and then the gap servo operation is started. At that time, the optical head 5 nearly stops since the value of the approach voltage has reached the final voltage value. In other words, the movement speed thereof is substantially zero. Accordingly, the initial speed of the optical head 5 at the start of the gap servo operation is substantially zero.

In this embodiment, the initial position of the optical head 5 is set so as that the speed of the optical head 5 becomes substantially zero at the position thereof at the start of the gap servo operation. In other words, the distance between the optical disk 47 and the optical head 5 is preliminarily set so as that the speed of the optical head 5 becomes substantially zero at the position thereof at the start of the gap servo operation. This initial position thereof is located in the far-field region from the optical disk 47. Thus, the approaching operation of the optical head 5 based on the speed determined by the approaching-speed generating section 23 and the gap servo operation can be controlled independent of each other. Consequently, the gap can be controlled by a system of a relatively simple configuration.

Figure 8:
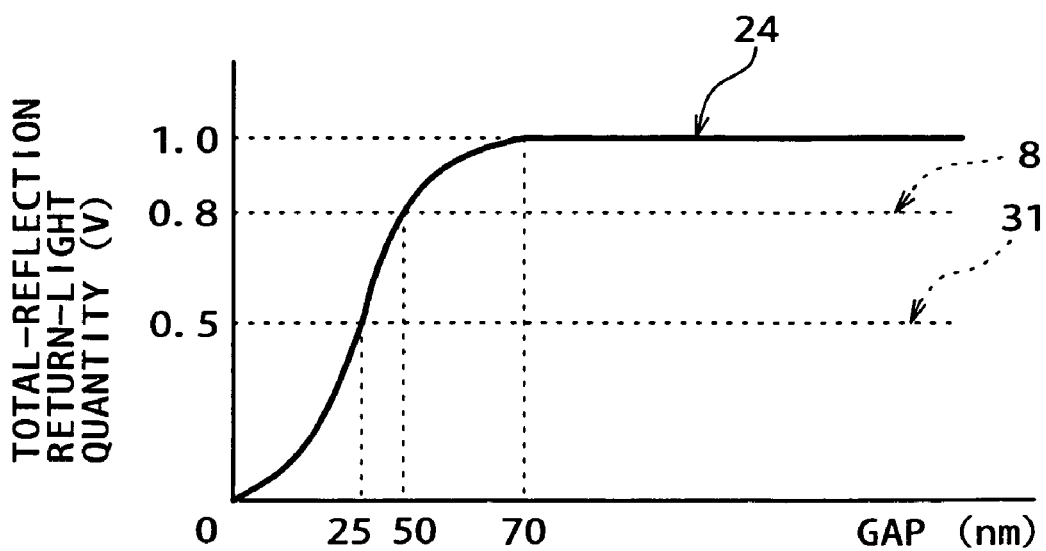
FIG. 8 is a graph illustrating an example of setting of a gap servo initial threshold value and a gap servo target value.

FIG. 8 is a graph illustrating an example of the setting of the gap servo initial threshold value 8 and the gap servo target value 31. For example, if the value of the total-reflection return-light quantity 24 in the far-field is normalized to 1 (V), the gap servo target value 31 may be set at 0.5 (V). As compared with the case where the gap servo target value 31 is set at a value, which is larger than the threshold value 8, by setting the gap servo target value 31 at a value, which is smaller than the gap servo initial threshold value 8, the gap can efficiently be controlled while reducing a control time. Moreover, the collision of the optical head 5 with the optical disk 47 can be surely prevented.

In a case where the optical disk 47 is made of silicon, the distance, at which the total-reflection return-light quantity 24 starts decreasing, is about 70 nm. The distance, at which the total-reflection return-light quantity 24 reaches the gap servo initial threshold value, is about 50 nm. The gap servo target value is about 25 nm.

The gap servo control in this embodiment is equivalent to the controlling of the optical head 5 so as that the optical head 5 is moved from the initial position located at the distance of nearly 70 nm from the disk at the initial speed of almost zero to the position located at the distance of approximately 50 nm from the disk. This is a step response of the system. According to this embodiment, the SIL 2 does not collide with the optical disk even without changing the gap servo target value with respect to time, that is, even if the gap servo target value 31 is fixed. The collision can be prevented simply by designing the gap servo such that the initial position of the optical head is set in such a way as not to cause overshoot.

Figure 9:
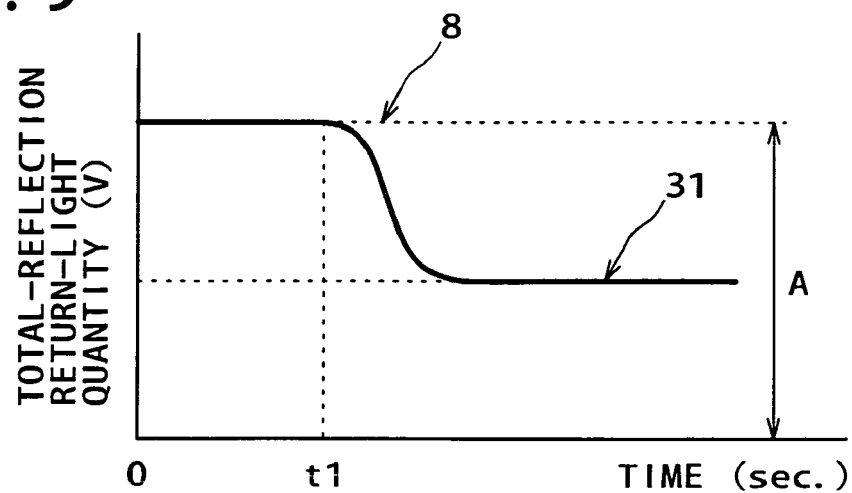
FIG. 9 is a graph illustrating a typical response waveform representing a total-reflection return-light quantity according to an embodiment of the present invention.
Figure 12:
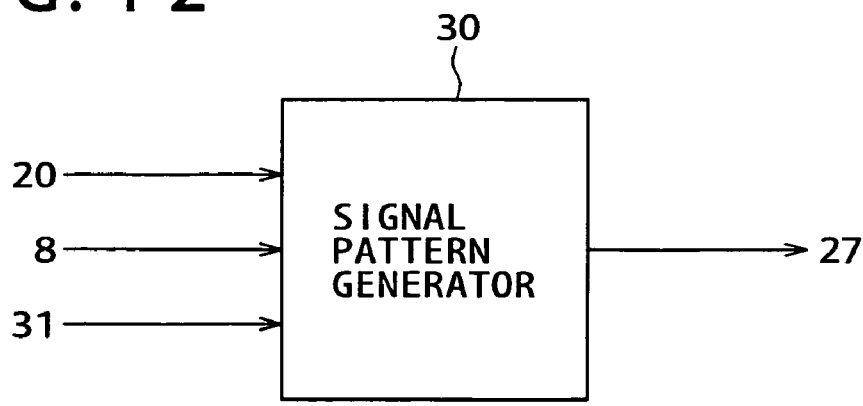
FIG. 12 is a diagram illustrating a signal pattern generator according to an embodiment of the present invention.

FIG. 9 illustrates a typical response waveform representing the total-reflection return-light quantity according to this embodiment. According to the embodiment of the present invention, the initial speed of the optical head 5 at the start of the gap servo operation is substantially zero. Thus, the overshoot does not occur, as illustrated in FIG. 12, simply by preliminarily setting the initial position of the optical head 5, as above-mentioned. The response waveform illustrated in FIG. 9 is a waveform representing the time change of the gap. In other words, in this embodiment, the optical head 5 can smoothly be moved from the start of the gap servo operation (the time t=t1 and the gap servo initial threshold value is 8) to a moment at which the length of the gap reaches the gap servo target value 31.

According to the embodiment of the present invention, the collision of the optical head 5 with the optical disk 47 can be surely prevented while reducing time, which is taken to cause the head to be controlled in such a way as to move to a target position in the near-field region, as much as possible.

Figure 10:
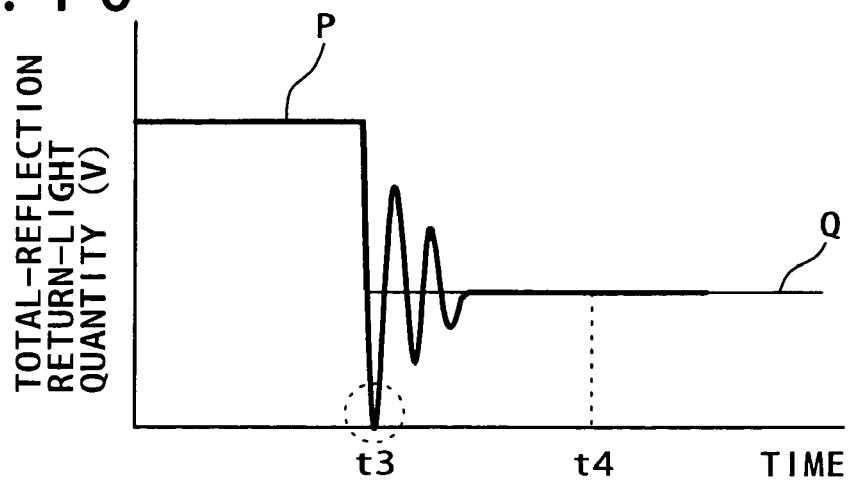
FIG. 10 is a graph illustrating a total-reflection return-light quantity during a gap servo operation of related art in which only a gap servo is used.

FIG. 10 illustrates the time change of the total-reflection return-light quantity in a case where overshoot occurs if the gap servo is controlled by using related art technology, i.e., controlled only based on the total-reflection return-light quantity. A value designated by reference character P is that of the total-reflection return-light quantity 24 in a case where the SIL is positioned in the far-field region (or the gap length in a case where the SIL is positioned in the far-field region) In this case, if a gap servo loop is operated from the far-field region to the near-field region to thereby control the optical head until the optical head reaches the gap servo target value Q, the SIL would collides with the disk. This is because the relation of the total-reflection return-light quantity with the voltage applied to the 3-axis device exhibits a dead band characteristic in the far-field region. Accordingly, an excessive voltage is applied to the 3-axis device in order to cause the SIL to further approach the disk. On the other hand, when the SIL enters the near-field region, the relation of the total-reflection return-light quantity with the voltage applied to the 3-axis device becomes to exhibit a linear characteristic. As a result, the SIL becomes uncontrollable and collides with the disk due to the excessive voltage. In the example illustrated in the figure, the collision occurs at moment t3.

Alternatively, it may be possible to perform a method of setting the approach voltage to be a ramp-like input voltage and of starting a gap servo operation when the SIL enters the near-field region. In the case that the approach voltage is set to be a ramp-like input voltage, the intrinsic system response of the total-reflection return-light quantity has a waveform designated by reference character R in FIG. 11. Reference character P designates a value of the total-reflection return-light quantity during the SIL is positioned in the far-field region (or a value of the gap length during the SIL is positioned in the far-field region). Reference character Q designates a value of the total-reflection return-light quantity corresponding to the gap servo target value (or designates the gap servo target value). However, because the initial speed of the SIL at the start of the gap servo operation is not almost zero and has a value corresponding to disturbance of the speed. Thus, the repose waveform is obtained as indicated by a thick solid line shown in FIG. 11. In this case, even if the system response is adapted in such a way as not to cause overshoot, the system response has a value corresponding to the disturbance of the speed of the optical head, and there is possibility of occurrence of overshoot.

Figure 11:
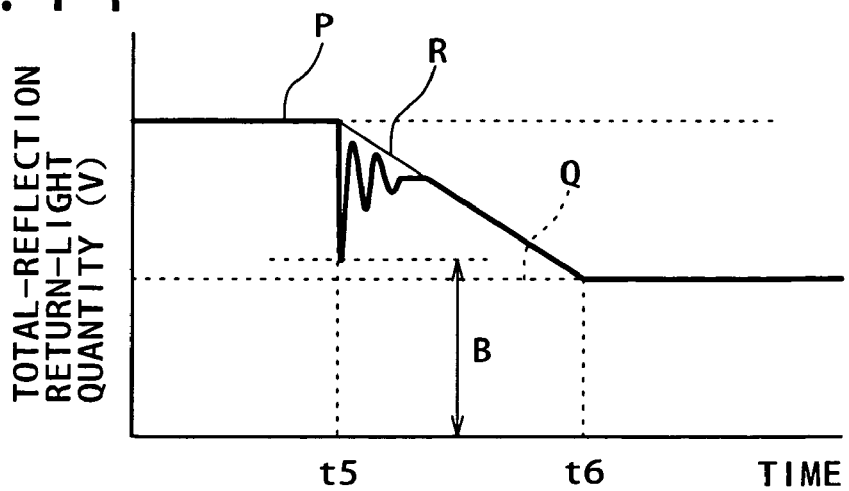
FIG. 11 is a graph illustrating a total-reflection return-light quantity during another gap servo operation of related art.

As can be seen from FIGS. 9 and 11, the relation of A>B hold if collision-avoidance margins A and B at the start of the gap servo operation are compared with each other. Thus, according to an embodiment of the present invention, the collision avoidance margin can be increased. This is because the initial speed of the optical head 5 at the start of the gap servo operation is substantially zero. Accordingly, the originally-intended performance of a gap servo response can be obtained, and the pull-in response of the optical head 5 from the start of the gap servo operation is determined only by the gap servo response. Consequently, there is no restriction of a pull-in time ((t6-t5) shown in FIG. 11)), which is as illustrated in FIG. 10.

It should be noted that the present invention is not limited to the above-mentioned embodiment. Various modifications may be made.

For instance, in the embodiment described above, the gap servo target value 31 is fixed. However, to improve the pull-in response of the gap servo, the gap servo target value may be changed with respect to time. For example, as illustrated in FIG. 12, an output signal of the comparator 20, the gap servo initial threshold value 8, and a final gap-servo target value 31, which is set at the gap servo target value setting section 22 (see FIG. 4), are inputted to the signal pattern generator 30. Then, a pattern signal representing the servo voltage 27 is outputted based on these values. In this case, an output of the signal pattern generator 30 is compared with the total-reflection return-light quantity, as illustrated in FIG. 4, to thereby calculate the difference therebetween. Then, a voltage corresponding to this difference is outputted as the servo voltage 27.

Figure 13:
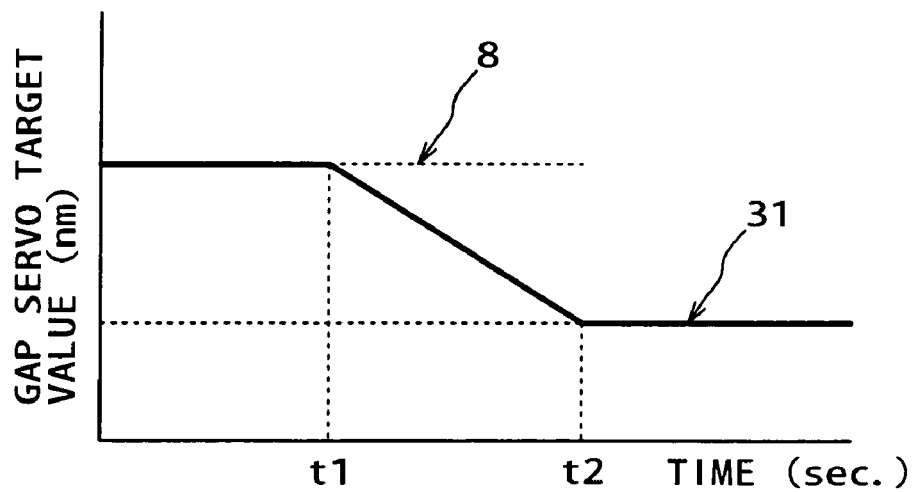
FIG. 13 is a graph illustrating an output signal of the signal pattern generator shown in FIG. 12.

The signal pattern generator 30 outputs a signal representing a value interpolated between the final gap-servo target value 31 and the gap servo initial threshold value 8, which is set as that indicated by a start pulse at a moment when the transition of the output of the comparator 20 from Low to High occurs, that is, at a moment when the SIL moves from the far-field region to the near-field region. The value represented by this signal is the gap servo target value. FIG. 13 illustrates an example of this gap servo target value. In this case illustrated in FIG. 13, the signal pattern generator 30 outputs signals so that values interpolated between the gap servo initial threshold value 8 and the final gap servo target value 31 are obtained by performing linear interpolation between the moments t7 and t8.

Figure 14:
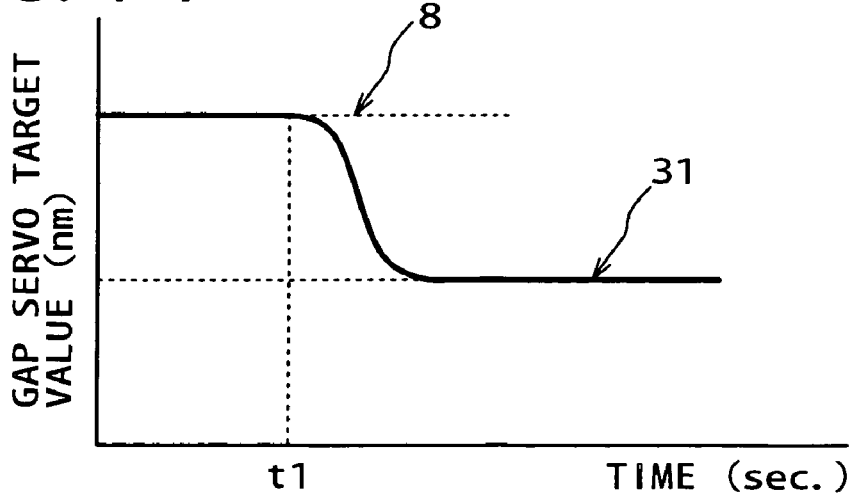
FIG. 14 is a graph illustrating an output signal of a gap servo target value setting section in a case where a gap servo target value is fixed and where a step-like signal representing a gap servo target value is lowpass-filtered.

Further, in the case where the gap servo target value 31 is fixed, an output signal of the gap servo target value setting section 22 is a step-like signal at moment t1. Therefore, even if the gap servo target value 31 is fixed, the step-like change of the target value is blunted, as illustrated in FIG. 14, by lowpass-filtering the target value, which changes like the step, through the use of a lowpass filter (not shown in the figure).

It should be understood by those skilled in the art that various modifications, combinations, sub-combinations and alternations may occur depending on design requirements and other factors insofar as they are within the scope of the appended claims or the equivalents thereof.

What is claimed is:

1. An optical disk apparatus, comprising:
a light source configured to output light;
a head disposed so as to face a disk on which a signal is recordable, the head being configured to condense light output from the light source onto the disk as near-field light;
a distance adjusting mechanism configured to adjust a distance between the head and the disk;
first control means for causing the head to approach the disk and for controlling the head in such a way as to nearly stop at a position where a distance from the disk is a first distance at which the light is condensed on the disk by the head as the near-field light;
detection means for detecting if the distance between the head and the disk is the first distance, wherein the detection means detects a total-reflection return-light quantity for detecting the distance between the head and the disk; and
second control means for controlling the distance adjusting mechanism based on a detection signal outputted by the detection means so that the distance between the head and the disk is a second distance under a condition in which the light is condensed on the disk as the near-field light.

2. The optical disk apparatus according to claim 1, wherein:
the second control means controls the distance adjusting mechanism in such a way that the second distance is less than the first distance.

3. The optical disk apparatus according to claim 1, further comprising:
measuring means for measuring a quantity of return light from the disk, the quantity corresponding to the light outputted from the light source;
wherein the second control means controls the distance adjusting mechanism based on the quantity of return light measured by the measuring means.

4. The optical disk apparatus according to claim 1, further comprising:
means for setting a third distance between the head and the disk before the head is controlled by the first control means in such a way that the head is nearly stopped at the position at the first distance.

5. The optical disk apparatus according to claim 1, further comprising:
means for setting the second distance by making the second distance to vary with time.

6. A method for controlling an optical disk apparatus, the method comprising:
(a) a step of causing a head to approach a disk, the head being disposed so as to face the disk on which a signal is recordable, the head being configured to condense light output from a light source onto the disk as near-field light;
(b) a step of nearly stopping the head that is approaching the disk at a position at which a distance from the disk is a first distance at which the light is condensed on the disk by the head as the near-field light;
(c) a step of detecting if the distance between the head and the disk is the first distance, wherein the detecting step includes detecting a total-reflection return-light quantity for detecting the distance between the head and the disk; and
(d) a step of controlling the distance between the head and the disk based on a detection signal detected at the step (c) such that the distance therebetween is a second distance under a condition in which the light is condensed on the disk as the near-field light.

7. An optical disk apparatus, comprising:
a light source configured to output light;

a head disposed so as to face a disk on which a signal is recordable, the head being configured to condense light output from the light source onto the disk as near-field light;

a distance adjusting mechanism configured to adjust a distance between the head and the disk;

a first controller configured to control movement of the head so as to approach the disk to and nearly stop at a first position, the first distance being a distance at which the light is condensed on the disk by the head as the near-field light;

a detector configured to detect if the distance is the first distance, wherein the detector is configured to detect a total-reflection return-light quantity for detecting the distance between the head and the disk; and a second controller configured to control the distance adjusting mechanism based on a signal from the detector so that the distance between the head and the disk is kept constant under a condition in which the light is condensed on the disk as the near-field light.

* * * * *